Feb. 7, 1939.  V. HIERGESELL  2,146,394
THERMOMETER CASING
Filed Sept. 2, 1937
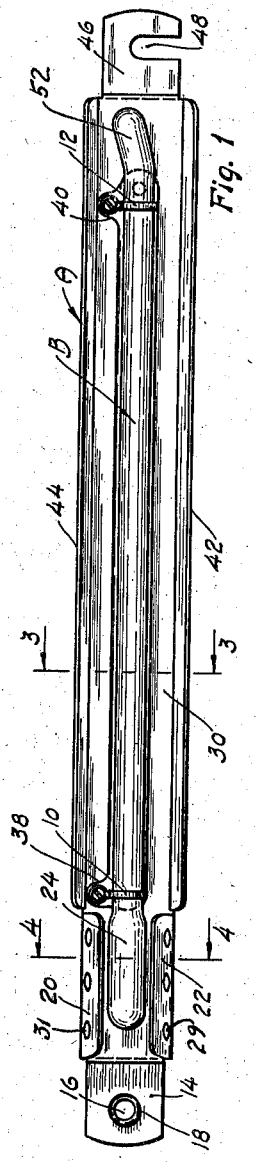
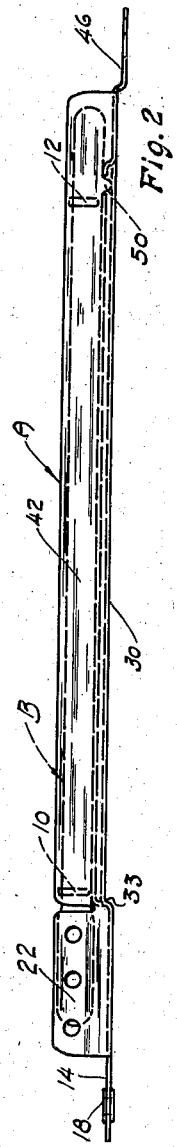
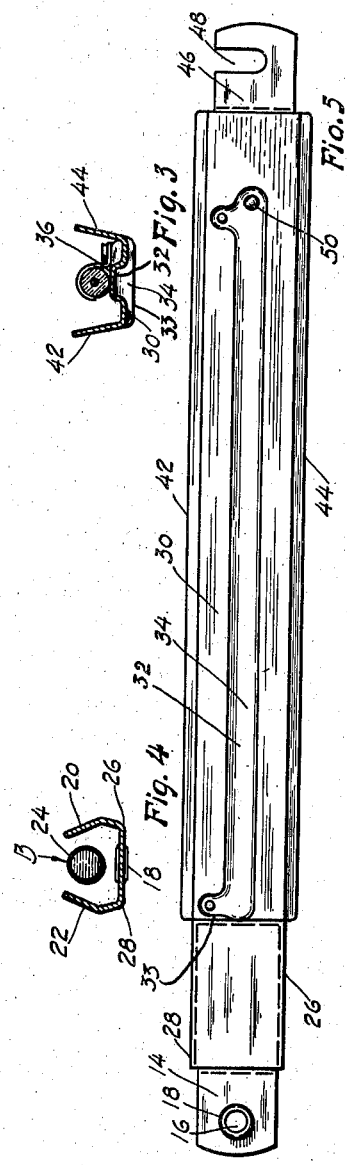
INVENTOR
Valentine Hiergesell
BY
Harry Langsam
ATTORNEY Patented Feb. 7, 1939

2,146,394

UNITED STATES PATENT OFFICE 2,146,394

THERMOMETER CASING

Valentine Hiergesell, Philadelphia, Pa., assignor to H-B Instrument Company, Philadelphia, Pa., a corporation of Pennsylvania Application September 2, 1937, Serial No. 162,117

2 Claims. (Cl. 73—376)

My invention relates to temperature measuring device and relates particularly to a horizontally positioned minimum temperature registering thermometer employed in orchards.

To determine whether or not the temperature has fallen sufficiently low to harm fruit bearing trees, orchardists employ thermometers, each having a minimum temperature index thereon, at suitably located places. If the orchardist finds by reading the thermometer that the temperature is approaching the harmful or fruit freezing zone he may increase the temperature of the air surrounding the fruit bearing trees by means of heat emitted from smudge pots. The temperature may be artificially raised as high as 15° F. by means of smudge pots, in order to prevent harmful injury by freezing of the fruit. Hence, each morning the observer usually drops one end of the thermometer so that the movable index therein will slide in the fluid. The minimum index will not move forward with forward movement of the liquid but it will recede with the decrease in temperature and the backward flow of the thermometer liquid. Hence, it is desirable to know the lowest outdoor temperature during each 24 hour period. Therefore, it is customary to rigidly pivot one end of the thermometer and hook the other end into some suitable holding means as a screw latch so that the index may be moved from its lowest temperature point of the preceding night. Hence, the frequent dropping of the end of the thermometer and its casing subjects the unit to hard usage.

It is, therefore, an object of my invention to provide a single stamping metallic casing for a minimum self-registering index thermometer which is horizontally positioned.

Another object of my invention is to provide an extension or projecting surface along the longitudinal axis of the case so that a portion of casing defining the channel supports the thermometer, and it, also, provides an air space between the thermometer and the supporting unit. This channel also adds strength to the casing.

Another object of my invention is to provide vents on the guards about the bulb in order that the air may circulate about the bulb thereby providing a true measure of the temperature.

Another object of my invention is to space the central part of the casing from the support in order to prevent the warpage of either the casing or of the wall from breaking the thermometer.

Another object of my invention is to provide a swivel at one end of the thermometer casing in order to allow the free movement of the casing about its pivotal point.

Other objects of my invention are to provide an improved device of the character described of simple and economical construction, that is sturdy in construction, and which is efficient in operation.

With the above and related objects in view, my invention consists in the details of construction and combination of parts, as will be more fully understood from the following description, when read in conjunction with the accompanying drawing, in which:—

Fig. 1 is a plan view of my invention.

Fig. 2 is a side elevational view of my invention illustrated in Fig. 1.

Fig. 3 is a sectional view taken on the line 3—3 of Fig. 1.

Fig. 4 is a sectional view taken on the line 4—4 of Fig. 1.

Fig. 5 is a back view of the device illustrated in Figs. 1 and 2.

Referring now in particular detail to the device illustrated in the drawing, I show a metallic casing, generally designated as A, which is formed of a metal stamping.

Horizontally positioned along the longitudinal axis of the casing A is a minimum temperature registering thermometer B. Single screw clamps 10 and 12 about the thermometer column holds the thermometer in position.

The casing A is of a single metal stamping and has an end portion 14 which is adapted to be positioned against a wall or board, and within the end portion is a circular opening 16 for the reception of a holding screw (not shown). As the casing is pivotally mounted it has a loose eyelet 18 passing into opening 16, the eyelet being rotatable with respect to the casing. This rotatable eyelet 18 serves as a bearing about which the casing may freely rotate with respect to the supporting screw.

Short tabs or flanges 20, 22 substantially cover the top and bottom of the thermometer bulb 24 but they do not enclose the front of the bulb. The upper bulb tab 20 is bent from the line 26 and the lower bulb tab 22 is bent from the line 28. A plurality of vents 29 and 31 in the tabs 20, 22 respectively permit air to circulate about the bulb and so produce the correct temperature reading.

Adjacent a transverse line 33 joining the ends of the tabs 20, 22 the back wall 30 of the casing is offset with respect to the end 14.

The back wall 30 extends for a considerable length of the casing and is long as compared with its width. The back wall has an indented portion 32 which defines a longitudinal groove 34, (Figs. 3 and 5), and the inside surface 36 (when the casing is viewed from the front) of the indented portion carries the column of the thermometer B. The groove 34 provides a dead air space between the thermometer and the supporting wall (not shown). This dead air space therefore prevents heat being conducted from the supporting wall and so aids in a correct temperature reading. The indentation also serves to strengthen the casing A, so that it cannot be easily bent or twisted.

The inside surface 36 is also transversely extended at 38 adjacent one end and at 40 adjacent the other end. The purpose of these extensions 38 and 40 is to enable the ends of the holding straps 10 and 12 to be in the same plane as the inside surface 36 in which the thermometer rests.

From the upper longitudinal edge of the back 30 the casing is angularly bent to form an elongated flange 42, and from the lower longitudinal edge of the back the casing is angularly bent to form an elongated flange 44. Hence, the thermometer column is protected at its side, top and bottom and is open in the front.

At the other end of the casing is an offset which serves as a holding lug 46 lying in the same plane as end 14. Within this lug 46 is an open slot 48 adapted to rest upon a screw or support whereby the casing will be held in a horizontal position.

The thermometer column has an extension 50 formed therewith to fit into a complementary opening in the casing to aid in positioning and retaining the thermometer; and the end 52 of the thermometer column is angularly disposed with respect to the major portion of the thermometer to limit the movement of the minimum temperature index.

Although my invention has been described in considerable detail, such description is intended as illustrative rather than limiting, since the invention may be variously embodied, and the scope of the invention is to be determined as claimed.

I claim as my invention:—

1. The combination of a thermometer and a single integral casing for said thermometer, said thermometer adapted to be horizontally positioned, a longitudinally extending rib on said casing, one end of said casing offset from its intermediate portion, said thermometer located upon said rib with the bulb portion of the thermometer overlapping the aforementioned offset, a plurality of pairs of flanges, and one pair of flanges extending over the bulb portion of the thermometer and another pair of flanges extending over the column portion of the thermometer, said casing, rib and flanges and offset being made of a single integral casing.

2. A metallic casing of unitary construction, the ends of said casing offset with respect to the center of said casing, said casing adapted to be horizontally positioned, a thermometer mounted upon said casing, a horizontally extending lower flange and a horizontally extending upper flange partially surrounding the bulb upon said casing, each of said flanges having a plurality of vents therein, an upper flange and lower flange extending parallel to the thermometer tube and at an angle to the back of the casing, and an inwardly extending groove along the longitudinal axis of said casing, said thermometer positioned upon the outside surface of one of the inside walls which partially defines said groove.

VALENTINE HIERGESELL.